(12) United States Patent
Bakare et al.

(10) Patent No.: US 8,875,184 B1
(45) Date of Patent: Oct. 28, 2014

(54) CUSTOMIZATION OF MEDIA PLAY

(75) Inventors: Oladapo E. Bakare, Seattle, WA (US); Gurbinder S. Gill, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 350 days.

(21) Appl. No.: 13/338,092

(22) Filed: Dec. 27, 2011

(51) Int. Cl.
  *G06F 3/00* (2006.01)
  *G06F 13/00* (2006.01)
  *H04N 5/445* (2011.01)

(52) U.S. Cl.
  USPC .................................. 725/41; 725/46; 725/47

(58) Field of Classification Search
  USPC ............................. 725/44, 45, 47, 41, 52, 56
  See application file for complete search history.

(56) References Cited

U.S. PATENT DOCUMENTS

| 8,151,301 | B2* | 4/2012 | Bennett | 725/41 |
| 2002/0194607 | A1* | 12/2002 | Connelly | 725/87 |
| 2008/0141307 | A1* | 6/2008 | Whitehead | 725/46 |
| 2012/0078953 | A1* | 3/2012 | Araya | 707/769 |
| 2013/0167168 | A1* | 6/2013 | Ellis et al. | 725/12 |
| 2014/0013353 | A1* | 1/2014 | Mathur | 725/34 |

* cited by examiner

*Primary Examiner* — Ngoc Vu
(74) *Attorney, Agent, or Firm* — Thomas Horstemeyer, LLP

(57) ABSTRACT

Disclosed are various embodiments for personalized online video channels. Various embodiments of the present disclosure facilitate creation and transmission of user defined video channels for viewing television programs via the Internet. The application facilitates specification of at least one user-defined channel that transmits video content items to the client. The application maintains a data store of video content items. The application selects a subset of the video content items for inclusion in the user playlist. The application determines an order of transmission of each of the video content items in the user playlist. The application facilitates specification of at least one user-defined channel.

19 Claims, 6 Drawing Sheets

CUSTOMIZATION OF MEDIA PLAY

BACKGROUND

Television programs may be viewed online. Online television programs may be downloaded to a personal computer, streamed through a website, and/or any other mechanism for viewing television programs via the Internet. As technology advances an increasing number of online television programs are becoming available.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to implementing online video channels. Various embodiments of the present disclosure facilitate creation and transmission of video channels for viewing television programs on-demand via the Internet. For example, in some embodiments, the media channel application may be executed by a computing device such as a server. A user manipulates a client to interface with the media channel application by selecting a channel that is defined by one or more category designations of video content items. The video content items may include for example, movies, television shows, sports broadcasts, news broadcasts, games, and/or other media items. In one embodiment, the channels may be predefined. In another embodiment, the channels may be user-defined. In response to the channel selection, the media channel application generates a subset of the video content items that fall within one or more of the category designations associated with a selected channel. The media channel application encodes and transmits serially a preview of each of the video content items to the client. A user employing a client may select one or more of the video content items from the previews to be transmitted to the client in its entirety. The media channel application encodes the selected video content item for rendering for display and transmits the selected video content item for viewing. Additionally, a user may interact with the media channel application to create, store, and/or display one or more user-defined channels for future access. In the following discussion, a general description of the system and its components is provided, followed by a discussion of the operation of the same.

Figure 1:
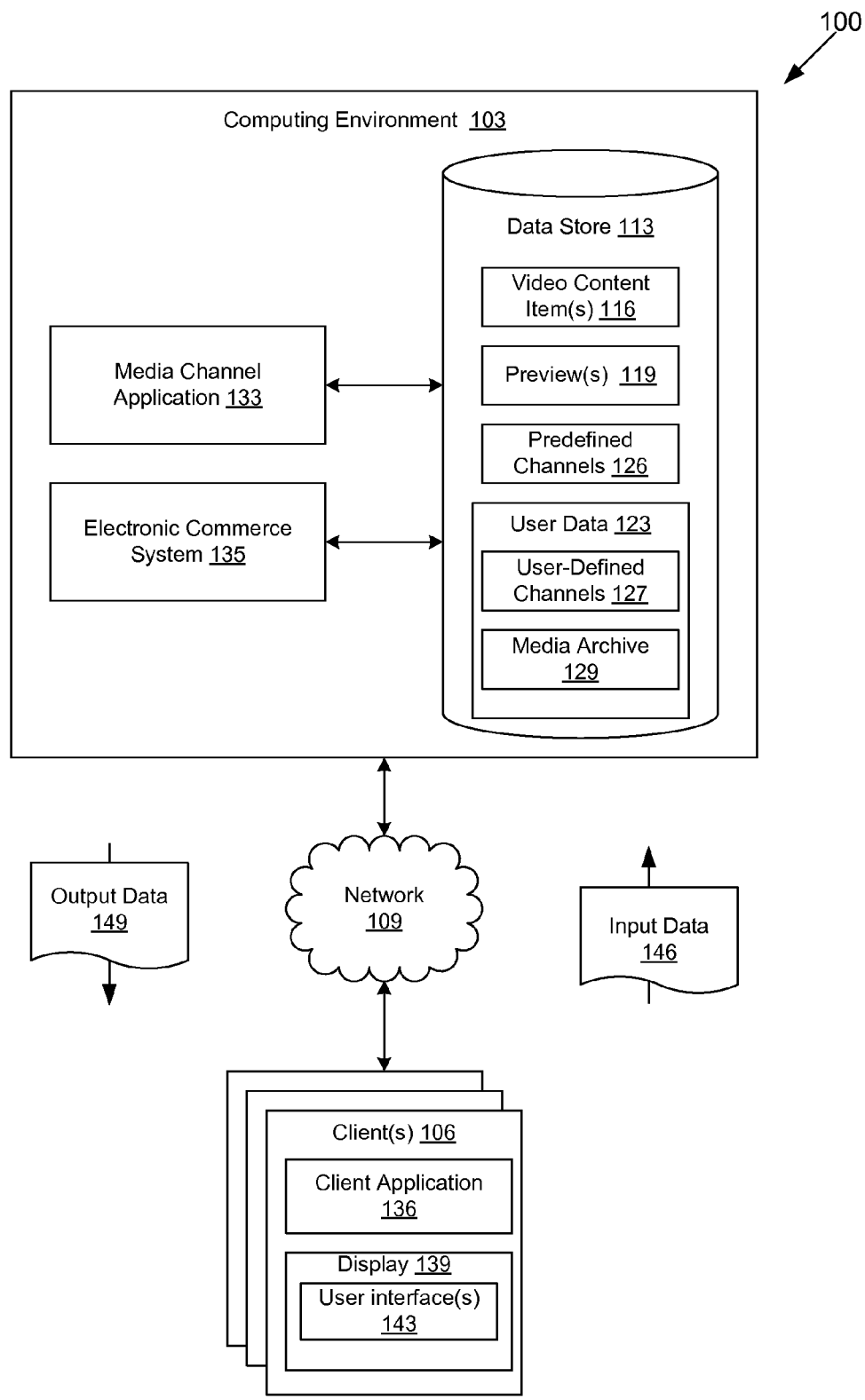
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 by way of network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may comprise a plurality of servers or other computing devices that are arranged, for example, in one or more server banks or computer banks or other arrangements. For example, the computing device 103 may comprise a cloud computing resource, a grid computing resource, and/or any other distributed computing arrangement. The computing environment 103 may be located in a single installation or may be distributed among many different geographical locations.

Various applications and/or other functionality may be executed in the computing environment 103 according to various embodiments. Also, various data is stored in a data store 113 that is accessible to the computing environment 103. The data store 113 may be representative of a plurality of data stores as can be appreciated. The data stored in the data store 113, for example, is associated with the operation of the various applications and/or functional entities described below. The components executed on the computing environment 103, for example, include the media channel application 133, electronic commerce system 135, and other applications, services, processes, systems, engines, or functionality not discussed in detail herein. The media channel application 133 is executed to create and transmit online video channels. The media channel application 133 may communicate with the client 106 over various protocols such as, for example, hypertext transfer protocol (HTTP), simple object access protocol (SOAP), real-time transport protocol (RTP), real time streaming protocol (RTSP), real time messaging protocol (RTMP), user datagram protocol (UDP), transmission control protocol (TCP), and/or other protocols for communicating data over the network 109. Additionally, the media channel application 133 may generate various streaming or otherwise transmitted content such as, for example, movies, television shows, sports broadcasts, news broadcasts, and/or other online television programs.

The electronic commerce system 135 is executed in order to facilitate the online purchase of video content items 116 over the network 109. The electronic commerce system 135 also performs various backend functions associated with the online presence of a merchant in order to facilitate the online purchase of video content items 116 as will be described. For example, the electronic commerce system 116 generates client applications 136 such as web pages or other types of network content that are provided to clients 106 for the purposes of selecting items for purchase, rental, download, lease, or other form of consumption as will be described.

The data stored in the data store 113 includes, for example, video content items 116, previews 119, user data 123, predefined channels 126 and potentially other data. The video content items 116 may include video content, audio/video content, and/or other content as can be appreciated. Each of the previews 119 may include a series of selected portions of one of the video content items 116 and/or other information related to the video content items 116. User data 123 includes various data associated with a user that employs a client 106 to interact with the application 133. User data 123 comprises data about the user of the client 106 that is authorized to receive the transmitted video content items 116. Such user data 123 may include information such as, usernames, passwords, security credentials, authorized applications, and/or other data.

Additionally, the user data 123 comprises one or more user-defined channels 127 that are served up to the client 106 by the media channel application 133. The priority or order in which the video content items 116 are presented can be modified based upon feedback from the client 106 manipulated by a user as will be described. The user data 123 further comprises a media archive 129. The media archive 129 includes information associated with video content items 116 that were transmitted to the client 109. In this respect, the media archive 129 provides a history of the video content items 116 transmitted to the client 106. For example, the media archive 129 provides a record of what video content items 116 were transmitted at what time to the client 106. User data 123 can also include one or more third party systems with which the user is associated. In one embodiment, a user of the media channel application 133 can link one or more third party sites with an account of the user, which can allow the media channel application 133 to access content associated with the user from the third party site as well as potentially publish information about the user's consumption of video content items 119 and/or other interests in the third party site. Predefined channels 126 include a list of preset channels defined by one or more category designations of video content items 116.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as client application 136, display 139, user interface 143 and/or other applications. The client application 136 may be executed in a client 106, for example, to access and render network pages, such as web pages, or other network content served up by the computing environment 103 and/or other servers. The client 106 may be configured to execute applications beyond client application 136 such as, for example, email applications, instant message applications, and/or other applications. To this end, the client application 136 includes graphical information that is employed, for example, to dynamically generate one or more user interfaces 143 that are transmitted to client 106 in order to enable a user that manipulates such client 106 to interact with application 133 as will be described.

The client application 136 is executed to allow a user to interact with media channel application 133 executed in the computing environment 103. To this end, the client application 136 is configured to receive input provided by the user through a display 139 and/or other input devices and send this input over the network 109 to the computing environment 103 as input data 146. The client side application 133 is also configured to obtain output data 149 such as, for example, video, audio, and/or other data over the network 109 from the computing environment 103 and render the same on the client 106. In one embodiment, the client application 136 comprises a plug-in within a browser application. The client 106 may include a display 139 and may include one or more other input devices. Such input devices may comprise, for example, devices such as keyboards, mice, joysticks, accelerometers, light guns, game controllers, touch pads, touch sticks, push buttons, optical sensors, microphones, webcams, and/or any other devices that can provide user input.

Next, a general description of the operation of the various components of the networked environment 100 is provided. To begin, a user manipulates a client 106 to interface with the media channel application 133 executed in the computing environment 103. The computing environment 103 executes the media channel application 133 in response to the appropriate user input. The media channel application 133 is executed in the computing environment 103 to serve up of video content items 116 to clients 106 and perform other functions as will be described. In one embodiment, a selection of a channel is received from the client 106 that is defined by one or more category designations used to identify a subset of video content items 116 from the data store to present to the user. For example, a category designation may include information such as a movie title, a name of an actor, a type of film genre, and/or other category designations as can be appreciated. In one embodiment, the application 133 facilitates specification of one or more user-defined channels 127 associated with one or more category designations when a user employing a client 106 wishes to create customized channels to be transmitted. As a result, the media channel application 133 may encode for display one or more of the user-defined channels based on the past customization of a user.

In response to the selection of a predefined channel 126, the media channel application 133 determines an order of transmission of each of the video content items 116 to be transmitted. To this end, the priority of video content items 116 transmitted to the user is modified as a function of client interaction with the media channel application 133. Next, the media channel application 133 transmits previews 119 of the subset of the video content items 116 that are deemed to be related to the channel selection. The previews 119 are transmitted and rendered serially on the client 106 so that the user may preview such video content items 116 and select one or more of the video content items 116 to watch, purchase, rent, download, etc.

Additionally, the media channel application 133 may facilitate the creation of a user data 123 by providing one or more user interfaces 143 for establishing the user data 123 if the user data 123 has not already been established. For instance, the application 133 may prompt the user to indicate a name for the user data 123, a password for the user data 123, an address, billing information, and/or any other parameter or user information for establishing the user data 123. The user interface 143 may be executed by the client application 136 to facilitate the selection of one or more of the video content items 116 from previews 119 to be transmitted to the client 106 in its entirety.

Each of the video content items 116 includes a rating value. The rating value for each of the video content items 116 is generated based on a number of factors such as feedback about the video content item 116 from a user employing a client 106 or other user, the frequency at which the video content item 116 has been transmitted, and/or other factors for determining the rating value associated with a given video content item 116. Such rating values may be updated from time to time based on the various factors. The priority of the video content items 116 may vary depending upon the rating values associated with each of the respective video content items 116. Such rating values may be stored in association with the video content item 116 in the media archive 129 for future reference.

The media archive 129 lists the video content items 116 and the user specific feedback received for each of the respective video content items 116. In addition, other information about each of the video content items 116 may be maintained in the media archive 129. Generally, the media archive 129 lists any video content item 116 that was transmitted to a specific user at a given time. For example, when a video content item 116 is first transmitted to a user, the media channel application 133 is configured to generate a new entry in the media archive 129 so that the user specific feedback associated with such video content item 116 can be stored for future reference. Additionally, the media archive 129 may be configured to detect video content items 116 that have been viewed, purchased, rented, and/or otherwise accessed by a user employing a client 106. To this end, the media archive 129 facilitates monitoring the frequency at which a user is presented with a particular video content item 116.

The feedback provided by a user employing a client 106 for a given video content item 116 may be embodied in the form or a positive or negative feedback that causes a rating value to be incremented for a respective video content item 116 based on the positive or negative feedback. For example, the feedback may be in the form of a "like" or a "pass" that indicates approval or disapproval of a given user employing a client 106. The feedback applied to a given video content item 116 may be tracked by the media channel application 133 with respect to the video content item 116 in order to determine the rating value as described above for the video content item 116. For example, every time a "like" or a "pass" is generated with respect to a given video content item 116 a corresponding rating value may be incremented, etc. Any feedback that indicates approval or disapproval of a given video content item 116 may be stored in association with the video content item 116 in the media archive 129 so that such data may be employed in calculating the rating value of the video content item 116. Additionally, the rating value associated with a respective one of the video content items 116 may be modified based upon a user employing a client 106 participating in a social networking site or other site.

In addition, a user interface 143 facilitates sending feedback that indicates approval or disapproval for a given video content item 116 based upon a manipulation of components of the user interface 143 on the client 106. Such feedback may be applied to the video content items 116 included that have yet to be transmitted to the client 106 by the media channel application 133. As such, the rating value for such a video content item 116 may be recalculated based upon the feedback received before it is transmitted to the client 106. Ultimately, the priority of the video content items 116 may be shifted or changed due to the changing rating values for the respective video content item 116 at any given time based upon feedback received with respect to such items. In this sense, a user employing a client 106 controls which video content items 116 are transmitted to the client 106 over time by virtue of the feedback provided to the media channel application 133. For example, significant positive feedback received for a given video content item 116 will give it a higher priority for transmitting to the client 106. Significant negative feedback will provide for a lower priority for transmitting of a given video content item 116. Additionally, the application 133 may display recommended video content items 116 or other items to the user based on the feedback received.

In order to calculate the media rating value at a given time, various functions may be employed such as a cost function as follows:

$$V = C_1 f_1 + C_2 f_2 + C_3 f_3 + \ldots + C_N f_N,$$

where V is the media rating value, $C_N$ are weighting constants, and $f_N$ comprises values representing the various factors as described above.

Figure 2A:
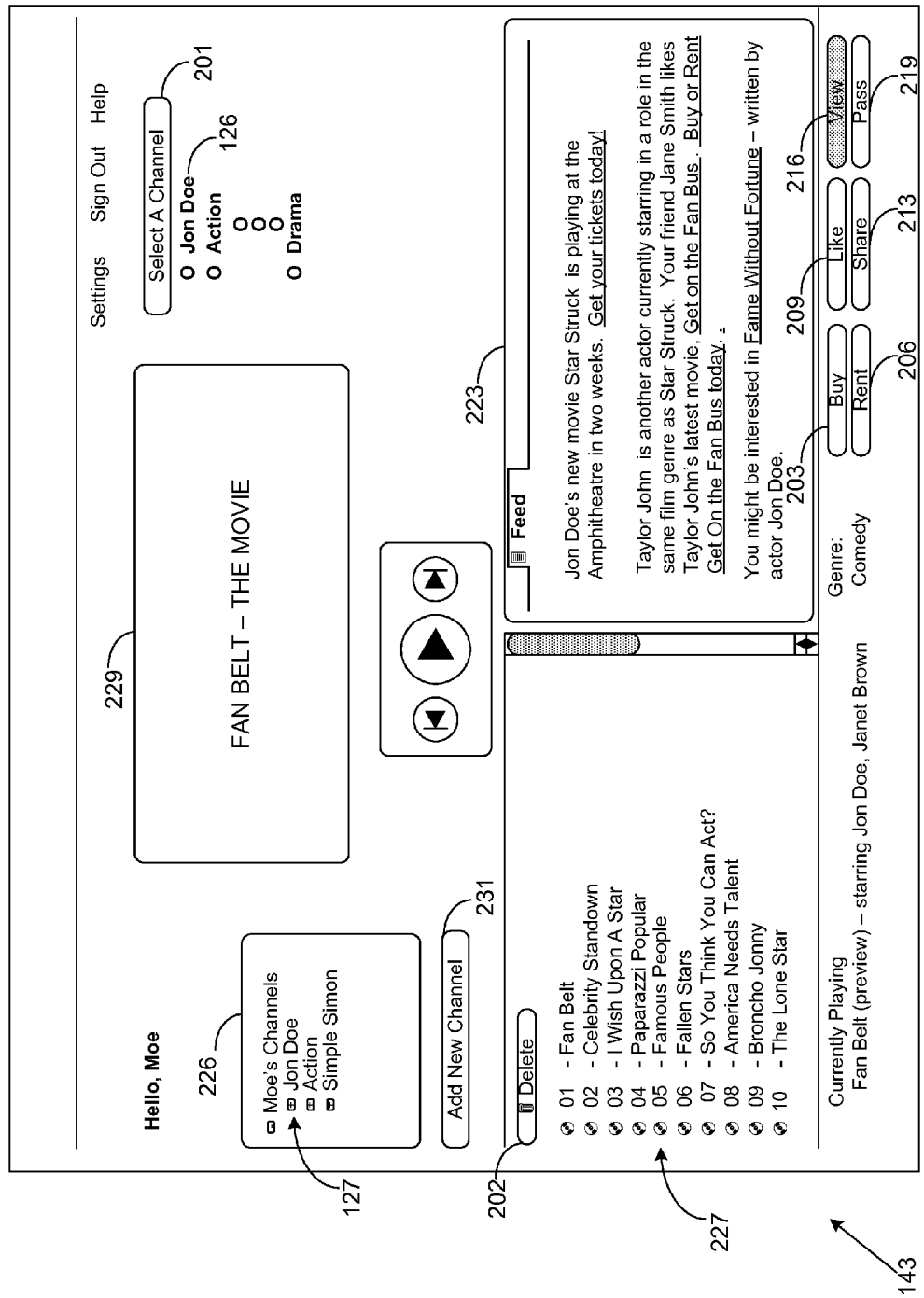
FIG. 2A and FIG. 2B are drawings examples of user interfaces rendered by a client in the networked environment of FIG. 1 according to various embodiments of the present disclosure.

Referring next to FIG. 2A, shown is one example of a user interface 143 according to various embodiments. The user interface 143 is rendered, for example, on a display 139 (FIG. 1) associated with a respective client 106 (FIG. 1) implemented by a client application 136 (FIG. 1). The user interface 143 depicts a visual playlist 227 of the video content items 116 (FIG. 1) that are slated to be transmitted to the client 106 as described above. At the top of the visual playlist 227 is a currently transmitted one of the video content items 116 that may be highlighted or differentiated from the remaining video content items 116 in the visual playlist 227 in some other manner. Alternatively, in one embodiment, a user may delete a selected one of the video content items 116 in the visual playlist 227 by selecting a video content item 116 to be removed from the visual playlist 227 and clicking the "delete" button 202, video content items 116 may be deleted in some other manner. Also, the user interface 143 includes a channel selector 201 so that a user may select a predefined channel 126 (FIG. 1). The user interface 143 also may include a "buy" button 203, a "rent" button 206, a "like" button 209, a "share" button 213, a "view" button 216, a "pass" button 219, and/or other mechanism for interacting with media channel application 133 (FIG. 1) or electronic commerce system 135 (FIG. 1).

The user interface 143 further includes a social network module 223 that publishes information relating to the video content item 116 currently being transmitted. The social network module 223 may also display information relating to video content items 116 that have not been transmitted. Further, the social network module 223 may be employed for a user employing a client 106 to communicate with other users relative to the video content item 116 or for other purposes. Additionally, users who are linked to other users in a social networking system may desire to view the media consumption activity of other users. As a non-limiting example, a user of a third party system can publish content that can be viewable to other users linked to the user. In some third party systems, for example, the content can be available to "friends", "followers", and/or other users in the publisher's "social network." In other words, a user can publish a "feed", which can be available to other users in the third party system. The social network module 223 may display data regarding other users to which a user is linked as well as information about the video content items 119 in which the user may have an interest. The social network module 223 can provide this data in real time as a user is interacting with the user interface 143.

Additionally, the user interface 143 may include a user channel display 226 that displays the user-defined channels 127. The user interface 143 also includes a viewing window 229 that displays the respective one of the video content items 116 that is currently being transmitted to the client 106. The media channel application 133 can capture the specified parameters associated with the user-defined channels created by a user. A user can authorize that the specified parameters associated with a particular user-defined channel to be provided to other users to whom the user is linked in a social networking system or any other system.

In one embodiment, in order to manipulate the components of the user interface 143, a user may "click" one of the components depicted in the user interface 143 by positioning a cursor over a given component and manipulating a button on a mouse associated with a client 106. Alternatively, other approaches may be used to manipulate the various buttons, icons, or other components of the user interface 143 as can be appreciated. For example, a user may "click" the channel selector 201 to choose one of the predefined channels 126. After a user has selected one of the predefined channels 126, a visual playlist 227 comprising a subset of the video content items 116 that fall within one or more of the category designations associated with the selected predefined channel 126 is rendered for display on the client 106. The media channel application 133 encodes and transmits serially a preview 119 of each of the subset of video content items 116 to the client 106. A user employing a client 106 may select one or more of the video content items 116 from the previews 119 to purchase, rent, download, view, or play on one or more clients 106. The media channel application 133 encodes the selected video content item 116 for rendering for display and transmits the selected video content item 116 for viewing in the viewing window 229.

The "like" and "pass" buttons 209 and 219 may be manipulated by a user to indicate approval or disapproval of a given video content item 116 listed in the visual playlist 227. When the "like" or "pass" buttons 209 and 219 are manipulated, the client application 136 sends a message to the media channel application 133 that informs the media application 133 of the approval or disapproval of the respective video content item 116. Such approval or disapproval is recorded in association with the video content item 116 in the media archive 129. Also, such approval or disapproval is associated with the video content item 116 in the visual playlist 227. Based upon the change in approval or disapproval of a given video content item 116, the media channel application 133 may recalculate a rating value for the video content item 116 which may result in shuffling or reordering of the priority of the video content items 116 in the visual playlist 227. The "share" button 213 of the media channel application 133 can allow users to share video content items 119 with other users to whom they are linked whether they are linked to the user in a social networking system or other type of system. In one embodiment, the media channel application 133 can populate the social network module 223 with information about a video content item 119 that a linked user is currently viewing. An "add new channel" button 231 is provided so that a user employing a client 106 may specify a user-defined channel 127 to be created and added to the channel display 226.

Figure 2B:
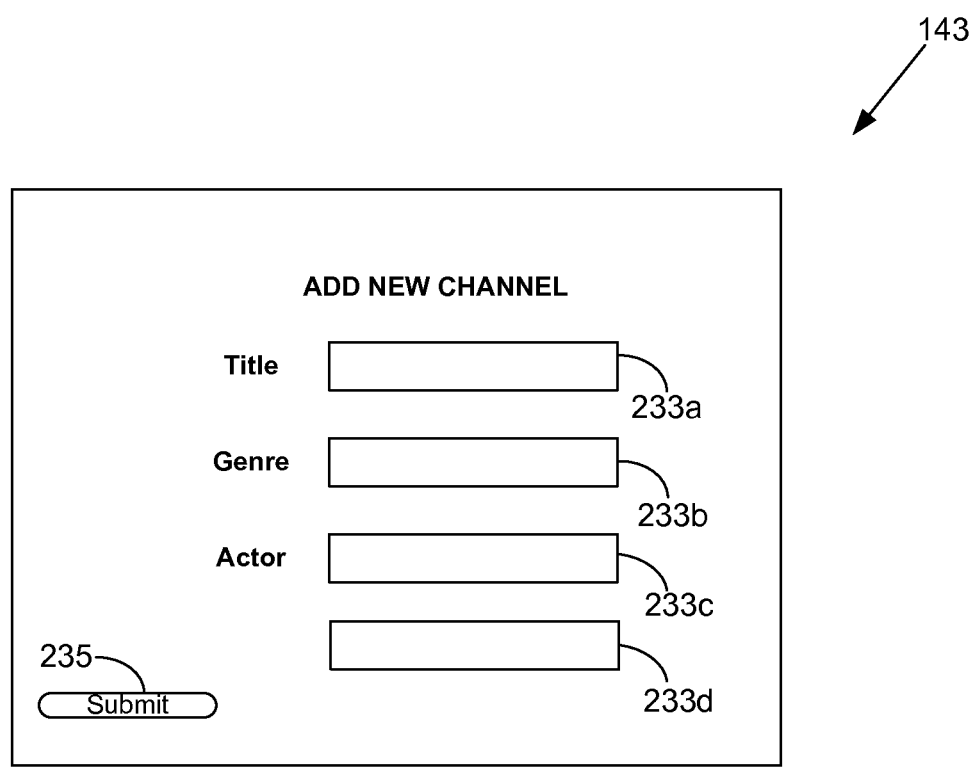

Turning now to FIG. 2B, shown is another example of a user interface 143 according to various embodiments. The user interface 143 is rendered, for example, on a display 139 (FIG. 1) associated with a respective client 106 (FIG. 1) implemented by a client side application 136 (FIG. 1). A user may interact with the media channel application 133 (FIG. 1) to create, store, and/or display one or more user-defined channels 127 (FIG. 1) for future access. A user may create a user-defined channel 127 by "clicking" on the "add new channel" button 231 (FIG. 2A) whereupon the user interface 143 is presented. Text boxes 233a . . . 233d may be provided so that a user may specify a film title, a name of actor, a film genre, and/or other parameters comprising a category designation that identifies a user-defined channel 127. A submit button 235 is included in the user interface 143 so that a user may indicate that a given user-defined channel be submitted for inclusion in the channel display 226 (FIG. 2A). Alternatively, other approaches may be employed to create user-defined channels 127. Such approaches may involve the use of selection boxes and buttons to cause a user-defined channel 127 to be created.

Figure 3:
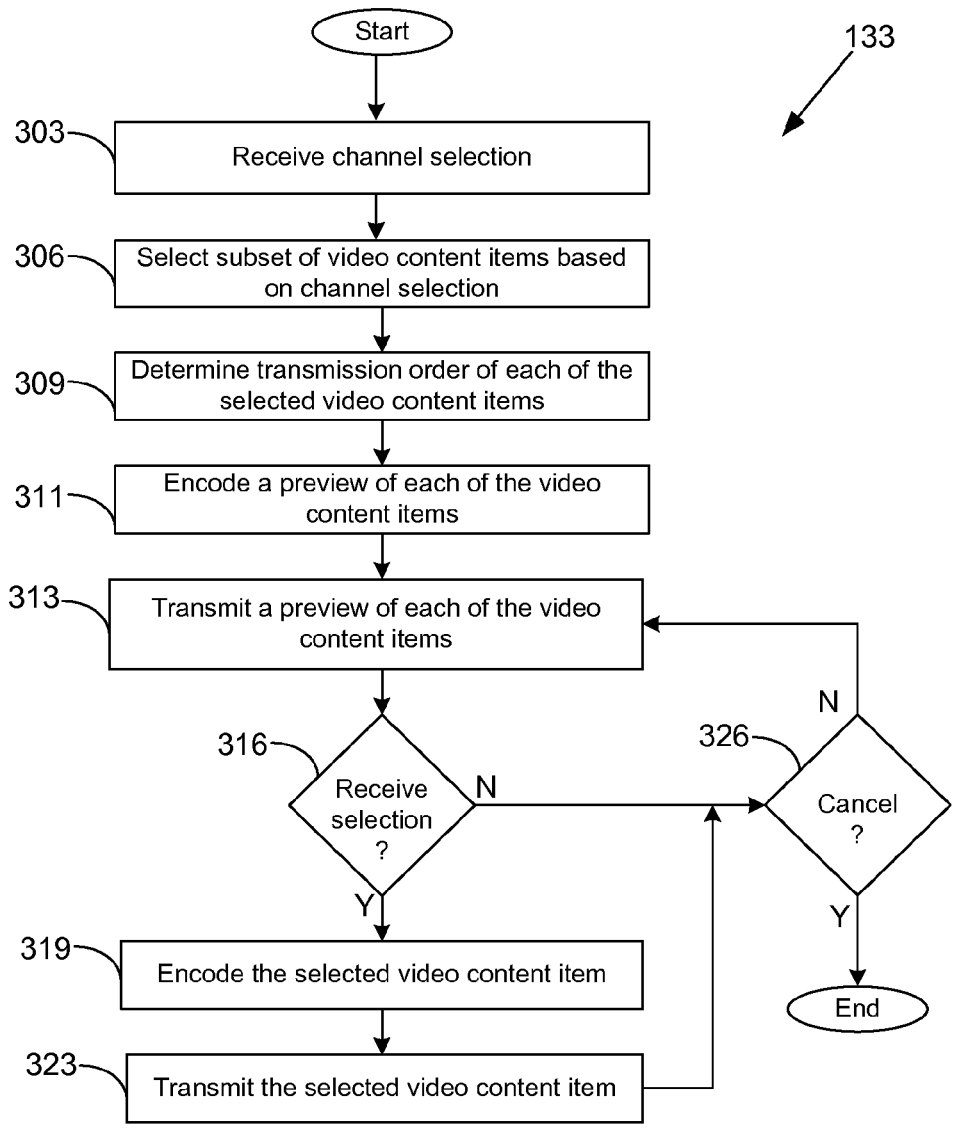
FIG. 3 is a flowchart illustrating one example of functionality implemented as portions of the media channel application executed in a computing environment in the networked environment of FIG. 1 according to various embodiments of the present disclosure.

Referring next to FIG. 3, shown is a flowchart that provides one example of the operation of a portion of the media channel application 133 according to various embodiments. It is understood that the flowchart of FIG. 3 provides merely an example of the many different types of functional arrangements that may be employed to implement the operation of the portion of the media channel application 133 as described herein. As an alternative, the flowchart of FIG. 3 may be viewed as depicting an example of steps of a method implemented in the computing environment 103 (FIG. 1) according to one or more embodiments.

In addition, the flowchart of FIG. 3 provides one example of how the media channel application 133 facilitates the selection of video content items 116 (FIG. 1) to be transmitted to clients 106 (FIG. 1) according to various embodiments. It is understood that the flow may differ depending on specific circumstances. Also, it is understood that other flows and user actions may be employed other than those described herein.

Beginning with box 303, when a user employing a client 106 (FIG. 1) desires to select one or more of the video content items 116 (FIG. 1) from the data store 113 for viewing, the user may select one of the channels 126/127, whereupon the media channel application 133 receives a channel selection from a client 106 (FIG. 1). In box 306, the media channel application 133 selects a subset of the video content items 116 transmitted to the client 106 and that are to be included in the visual playlist 227 (FIG. 2A) based on the channel selection. Specifically, video content items 116 that are identified fall into the specified channel designations or categories associated with the channel selection. Next, the media channel application 133 proceeds to box 309 and determines an order in which the video content items 116 are transmitted serially to the client 106. In box 311, the media channel application 133 encodes a preview 119 of each of the video content items 116. The preview 119 comprises a portion of the respective video content item 116. In box 313, the media channel application 133 serially transmits a preview 119 of each of the selected video content items 116 to a client 106. The application 133 then proceeds to box 316.

In box 316, the media channel application 133 determines whether a user employing a client 106 has selected one of the video content items 116 to view in its entirety or otherwise download, rent, purchase, etc. The selection may be made while viewing a respective preview 119 using the user interface 143 of FIG. 2A. If the media channel application 133 determines that a user has selected a respective one of the video content items, the media channel application 133 proceeds to box 319. If the application 133 determines that a user has not selected a respective one of the video content items 116, the media channel application 133 proceeds to box 326 as will be discussed herein. Assuming the media channel application 133 determines that a user has selected one of the video content items 126, the media channel application 133 moves to box 319.

In box 319, the application 133 encodes the selected one of the video content items 133 for rendering for display or delivery to the user, client, etc. Next, the media channel application 133 proceeds to box 323 in which the media channel application 133 transmits or otherwise supplies the selected one of the video content items 116 to the user. The media channel application 133 then moves to box 326. In box 326, the application 133 determines whether a request to cancel the application 133 has been received. If the media channel application 133 has not received a request to cancel, the media channel application 133 proceeds to box 313 as described above. Otherwise, the media channel application 133 ends.

Figure 4:
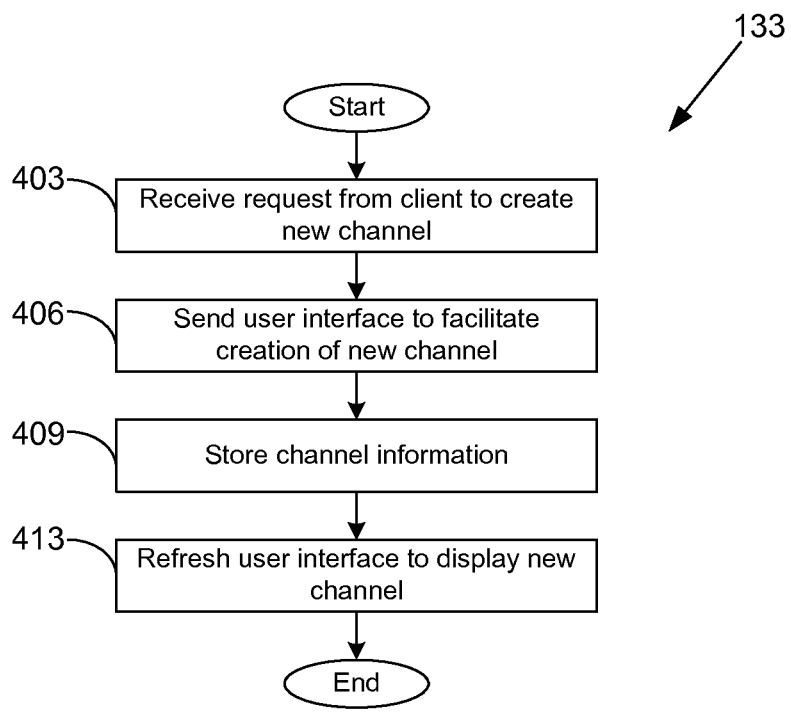
FIG. 4 is a flowchart illustrating another example of functionality implemented as portions of the media channel application executed in a computing environment in the networked environment of FIG. 1 according to various embodiments of the present disclosure.

Referring next to FIG. 4, shown is a flowchart that provides another example of the operation of a portion of the media channel application 133 implemented to create a user-defined channel 127 (FIG. 1) according to various embodiments. It is understood that the flowchart of FIG. 4 provides merely an example of the many different types of functional arrangements that may be employed to implement the operation of the portion of the application 133 as described herein. As an alternative, the flowchart of FIG. 4 may be viewed as depicting an example of steps of a method implemented in the computing environment 103 (FIG. 1) according to one or more embodiments.

Beginning with box 403, when a user employing a client 106 (FIG. 1) desires to create a user-defined channel 127, the media channel application 133 receives a request to create a user-defined channel 127 from the client 106. In box 406, the media application 133 sends the appropriate user interface 143 (FIG. 1) to facilitate the entry of information associated with the creation of the user-defined channel 127. In box 409, once the information is received, the media application 133 stores the information and creates a user-defined channel 127 that corresponds to the information that was submitted by the user. The media channel application 133 then proceeds to box 413. In box 413, the media channel application 133 refreshes the user interface 143 to display the user-defined channel 127 in the channel display 226 (FIG. 2A). Thereafter, the application 133 ends.

Figure 5:
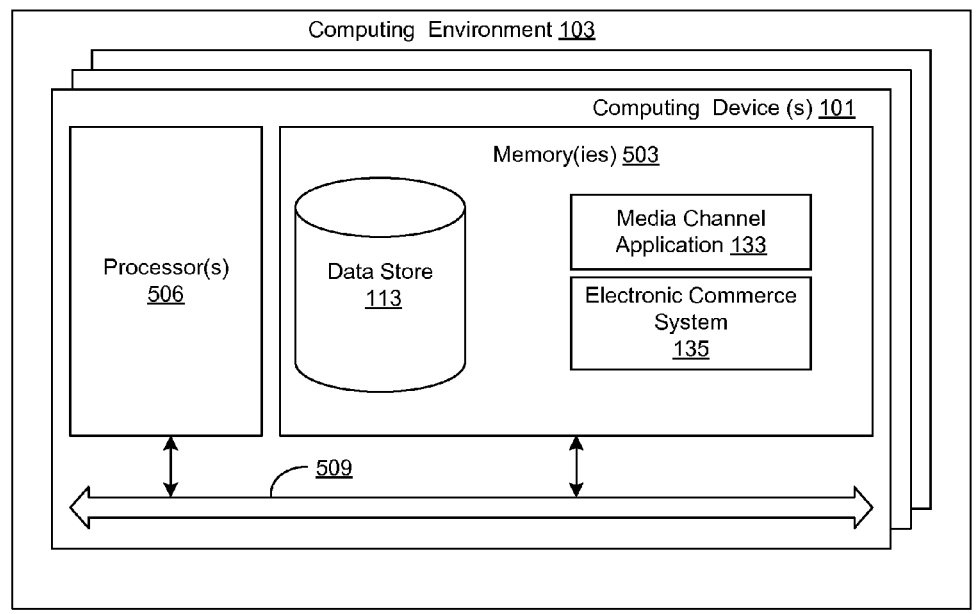
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes at least one computing device 101, at least one processor circuit, for example, having a processor 506 and a memory 503, both of which are coupled to a local interface 509. To this end, the computing environment 103 may comprise, for example, at least one server computer or like device. The local interface 509 may comprise, for example, a data bus with an accompanying address/control bus or other bus structure as can be appreciated.

Stored in the memory 503 are both data and several components that are executable by the processor 506. In particular, stored in the memory 503 and executable by the processor 506 are media channel application 133, electronic commerce system 135 and potentially other applications. Also stored in the memory 503 may be a data store 113 and other data. In addition, an operating system may be stored in the memory 503 and executable by the processor 506.

It is understood that there may be other applications that are stored in the memory 503 and are executable by the processors 506 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 503 and are executable by the processor 506. In this respect, the term "executable" means a program file that is in a form that can ultimately be run by the processor 506. Examples of executable programs may be, for example, a compiled program that can be translated into machine code in a format that can be loaded into a random access portion of the memory 503 and run by the processor 506, source code that may be expressed in proper format such as object code that is capable of being loaded into a random access portion of the memory 503 and executed by the processor 506, or source code that may be interpreted by another executable program to generate instructions in a random access portion of the memory 503 to be executed by the processor 506, etc. An executable program may be stored in any portion or component of the memory 503 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 503 is defined herein as including both volatile and nonvolatile memory and data storage components. Volatile components are those that do not retain data values upon loss of power. Nonvolatile components are those that retain data upon a loss of power. Thus, the memory 503 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 506 may represent multiple processors 506 and the memory 503 may represent multiple memories 503 that operate in parallel processing circuits, respectively. In such a case, the local interface 509 may be an appropriate network 109 (FIG. 1) that facilitates communication between any two of the multiple processors 506, between any processor 506 and any of the memories 503, or between any two of the memories 503, etc. The local interface 509 may comprise additional systems designed to coordinate this communication, including, for example, performing load balancing. The processor 506 may be of electrical or of some other available construction.

Although application 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the application 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 506 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including application 133, that comprises software or code can be embodied in any non-transitory computer-readable medium for use by or in connection with an instruction execution system such as, for example, a processor 506 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that stores a plurality of media content items in a data store;
   code that receives a selection of a channel, wherein the channel is associated with at least one category designation that is used to identify a subset of the media content items for the channel;
   code that determines an order of transmission of the media content items in the subset based at least in part upon a plurality of rating values;
   code that encodes for display at least one video preview of at least one of the media content items in the subset in response to the selection of the channel;
   code that transmits the at least one video preview to a client device;
   code that that receives an indication that the at least one video preview was selected by a user of the client device;
   code that transmits at least one of the media content items in the subset in accordance with the determined order of transmission of the media content items in the subset, wherein the at least one of the media content items is transmitted in response to receiving the indication that the at least one video preview was selected by the user;
   code that receives feedback data from the client device representing an interaction of the user with the at least one of the media content items that was transmitted to the client device; and
   code that modifies the determined order of transmission of the media content items in the subset based at least in part on the feedback data.

2. The non-transitory computer-readable medium of claim 1, wherein the program further comprises code that encodes for display at least one user interface, wherein the at least one user interface facilitates the interaction with the at least one of the media content items.

3. The non-transitory computer-readable medium of claim 1, wherein the program further comprises code that facilitates the user defining at least a portion of the channel.

4. The non-transitory computer-readable medium of claim 1, wherein the program further comprises code that displays a plurality of recommended video content items based at least in part on the feedback data received from the client.

5. A system, comprising:
   at least one computing device; and
   an application executable in the at least one computing device, the application comprising:
      logic that receives a selection of a channel from a client device, wherein the channel is associated with at least one category designation that is used to identify a subset of a plurality of video content items;
      logic that determines an order of transmission of the video content items in the subset based upon a plurality of rating values;
      logic that encodes for rendering a video preview of at least one video content item in the subset of the video content items in response to the selection of the channel;
      logic that transmits the video preview to a client device;
      logic that receives an indication that the video preview was selected by a user of the client device;
      logic that transmits at least one of the video content items in accordance with the determined order of transmission of the video content items in the subset, wherein the at least one of the video content item is transmitted in response to receiving the indication that the at least one video preview was selected by the user; and
      logic that changes the determined order of transmission of the video content items in the subset based at least in part upon feedback data from the client device.

6. The system of claim 5, wherein the application further comprises logic that encodes for display by the client device at least one representation of a plurality of recommended video content items based at least in part on the feedback data received from the client device.

7. The system of claim 5, wherein the category designation comprises a title of at least one of the video content items.

8. The system of claim 5, wherein the application further comprises logic that generates a video archive that identifies a history of the video content items transmitted to the client.

9. The system of claim 5, wherein the application further comprises logic that facilitates the user defining at least a portion of at least one of the channels.

10. The system of claim 5, wherein the application further comprises logic that encodes for display on at least one additional client device information relating to at least one of the video content items transmitted to the client device.

11. A method, comprising:
   obtaining, in at least one computing device, a selection of a channel, wherein the channel is associated with at least one category designation that is used to identify a subset of a plurality of video content items for the channel;
   determining, in the at least one computing device, an order of transmission of the video content items in the subset based at least in part upon a plurality of rating values;
   encoding, in the at least one computing device, at least one video preview of at least one of the video content items in the subset for display by a client device in response to receiving the selection of the channel;
   transmitting, using the at least one computing device, the at least one video preview to the client device;
   transmitting, using the at least one computing device, at least one of the video content items in the subset in accordance with the order of transmission, wherein transmitting the at least one of the video content items is initiated in response to receiving an indication that the video preview was selected by a user of the client device; and
   modifying, in the at least one computing device, the determined order of transmission of the video content items in the subset in response to a user interaction with the at least one of the video content items transmitted to the client device.

12. The method of claim 11, further comprising encoding, in the at least one computing device, for display a user interface that presents a plurality of predefined channels for selection.

13. The method of claim 11, wherein the at least one category designation corresponds to a name of an actor.

14. The method of claim 11, wherein the at least one category designation corresponds to a film genre associated with the video content items.

15. The method of claim 11, further comprising encoding, in the at least one computing device, at least one user interface that facilitates the user defining at least a portion of the channel.

16. The method of claim 15, further comprising storing, in the at least one computing device, the channel in association with a user account.

17. The method of claim 16, further comprising capturing, in the at least one computing device, a plurality of parameters associated with the channel.

18. The method of claim 17, further comprising sending, in the at least one computing device, the parameters associated with the channel to at least one other user account that is linked to the user account in a social networking system.

19. The method of claim 17, wherein at least one of the parameters comprises a name of an actor.

\* \* \* \* \*